(12) United States Patent
Madsen et al.

(10) Patent No.: US 11,300,346 B2
(45) Date of Patent: Apr. 12, 2022

(54) CRYOGENIC AND LCO$_2$ FLOUR CHILLING SYSTEM

(71) Applicant: Messer Industries USA, Inc., Bridgewater, NJ (US)

(72) Inventors: Scott T. Madsen, Burr Ridge, IL (US); Louis Lilakos, Oakville (CA); Monica Ortiz Cordova, Mississauga (CA)

(73) Assignee: Messer Industries USA, Inc., Wilmington, DE (US)

( * ) Notice: Subject to any disclaimer, the term of this patent is extended or adjusted under 35 U.S.C. 154(b) by 234 days.

(21) Appl. No.: 16/624,531

(22) PCT Filed: Apr. 19, 2018

(86) PCT No.: PCT/US2018/028262
§ 371 (c)(1),
(2) Date: Dec. 19, 2019

(87) PCT Pub. No.: WO2019/009939
PCT Pub. Date: Jan. 10, 2019

(65) Prior Publication Data
US 2020/0166266 A1 May 28, 2020

Related U.S. Application Data

(60) Provisional application No. 62/529,522, filed on Jul. 7, 2017.

(51) Int. Cl.
*A23B 9/10* (2006.01)
*B01F 25/312* (2022.01)
*F25D 3/12* (2006.01)

(52) U.S. Cl.
CPC .............. *F25D 3/12* (2013.01); *A23B 9/10* (2013.01); *B01F 25/312* (2022.01)

(58) Field of Classification Search
CPC ... F25D 3/12; F25D 3/127; F25D 3/10; F25B 2341/0013; B01F 2025/9122;
(Continued)

(56) References Cited

U.S. PATENT DOCUMENTS

| 4,308,669 A | * | 1/1982 | Noyes | ............... F26B 17/122 34/174 |
| 4,479,362 A | | 10/1984 | McWhorter et al. | |

(Continued)

FOREIGN PATENT DOCUMENTS

DE 102004062670 A1 6/2006

OTHER PUBLICATIONS

International Search Report for PCT/US18/28262, dated Jul. 13, 2018, Authorized Officer: Shane Thomas, 3 pgs.
(Continued)

*Primary Examiner* — Cassey D Bauer
(74) *Attorney, Agent, or Firm* — Joshua L. Cohen

(57) ABSTRACT

An apparatus for chilling a dry ingredient consists of a housing having an interior space through which the dry ingredient flows; a compression ring positioned in the interior space and through which the dry ingredient flows, the compression ring positionable within the interior space and having a region constructed to coact with the housing for providing an adjustable passageway through which a cryogen is introduced into the dry ingredient; and an injection port in fluid communication with the adjustable passageway for introducing the cryogen into the adjustable passage. A related method is also provided.

7 Claims, 7 Drawing Sheets

(58) Field of Classification Search
CPC ............ B01F 25/312; B01F 25/312511; B01F 2025/91; B01F 2025/91912; B01F 2025/919121; B01F 2005/0435; A23B 9/10
USPC ................ 137/888, 891, 893; 366/163.2
See application file for complete search history.

(56) References Cited

U.S. PATENT DOCUMENTS

| | | | |
|---|---|---|---|
| 4,619,113 | A | 10/1986 | Dubrulle et al. |
| 6,141,972 | A | 11/2000 | Evans |
| 6,334,313 | B1 | 1/2002 | Nagaishi et al. |
| 2003/0150624 | A1* | 8/2003 | Rummel ............... B05B 7/0037 169/45 |
| 2005/0058020 | A1* | 3/2005 | Lott ..................... B01F 25/312 366/165.2 |
| 2006/0153002 | A1 | 7/2006 | Ryan |
| 2006/0283196 | A1 | 12/2006 | Rosenbaum et al. |
| 2010/0085833 | A1 | 4/2010 | Zaiser et al. |
| 2011/0018256 | A1 | 1/2011 | Abarca Melo et al. |
| 2012/0103546 | A1* | 5/2012 | Maniere ................. B01F 23/41 106/206.1 |
| 2015/0175716 | A1 | 6/2015 | Robinson |
| 2016/0270433 | A1* | 9/2016 | Lilakos .................. A23L 3/375 |

OTHER PUBLICATIONS

Written Opinion of the International Searching Authority, dated Jul. 13, 2018, Authorized Officer: Shane Thomas, 11 pgs.

\* cited by examiner

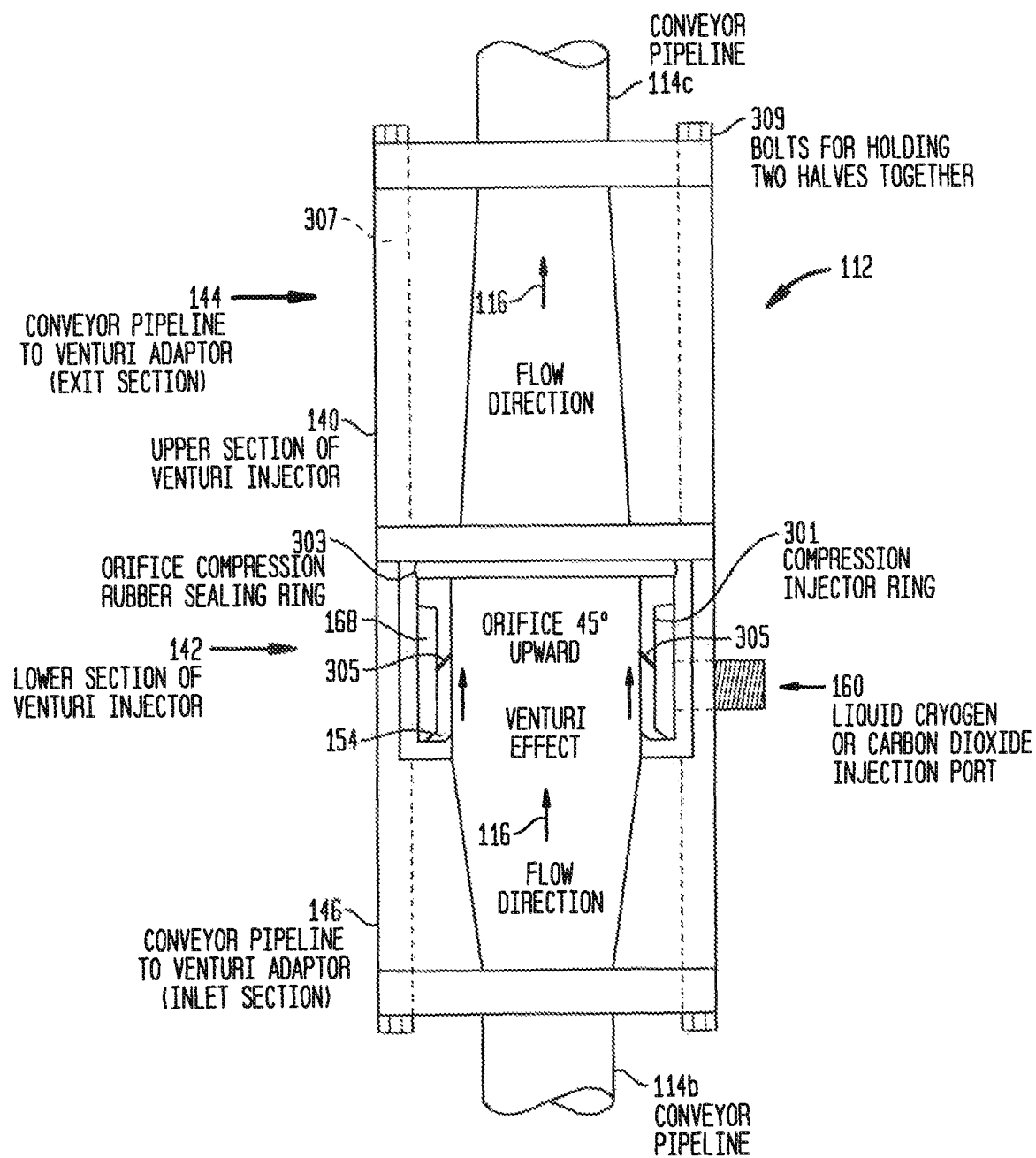

CRYOGENIC AND LCO₂ FLOUR CHILLING SYSTEM

BACKGROUND

The present embodiments relate to apparatus and methods to chill dry ingredients such as for example dry ingredients used in the food industry, within a pressure or vacuum conveyance system.

Within the baking industry, various ingredients are used for the production of dough products, including flour, sugars and other dry ingredients, which are blended or mixed according to a formulation or recipe. Many types of dough have strict temperature requirements to provide the proper dough consistency and quality required for process or bake off. Excessive temperatures in the doughs result in poor consistency or over proofed dough products, while warm dough will result in poor quality baked product. The dough will usually be scrapped/disposed of at this point, thereby reducing yields for the manufacturer and increasing costs.

Heat input into the dough is generally frictional from working the dough within a blender. Heat is also generated via the blender motor and introduced into the dough from the shaft of the blender paddle/ribbon extending into the dough to mix same. Fresh deliveries into the silos of flour recently milled will also be at high temperature. Dependent on geography, high summer temperatures and humidity will also increase storage temperatures, negatively affecting dough temperatures as a consequence.

Historically, carbon dioxide ($CO_2$) has been used as the cryogen of choice to chill the flour inline. However, within certain geographies, carbon dioxide may not be available, may not be available at a lower price point, or may not be consistently available.

SUMMARY OF THE INVENTION

This invention provides for use and commercialization of chilling inline conveyed flour and other dry ingredient products, using liquid nitrogen (LIN). It also represents an improvement over known flour chilling using carbon dioxide systems, by reducing capital costs and improving efficiencies.

This invention injects cryogenic substances such as LIN and/or $CO_2$ into the flour stream to rapidly chill the flour to an acceptable temperature that provides an optimum dough temperature for subsequent processing.

BRIEF DESCRIPTION OF THE DRAWINGS

For a more complete understanding of the present invention, reference may be had to the following description of exemplary embodiments considered in connection with the accompanying drawing Figures, of which:

FIG. 7 shows another schematic view of the venturi apparatus embodiment of FIG. 6 in operation.

DETAILED DESCRIPTION OF THE INVENTION

Figure 1:
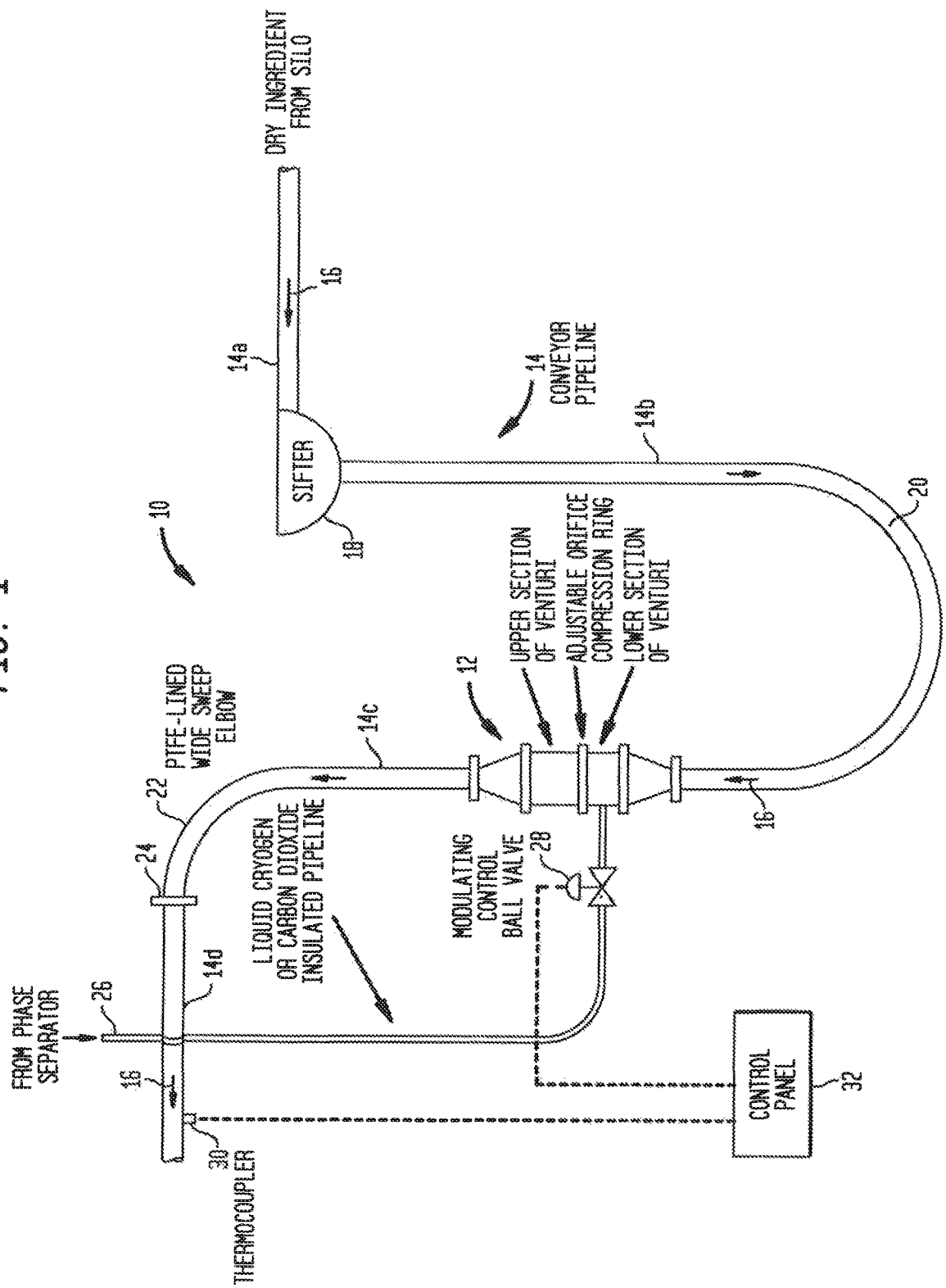
FIG. 1 shows a schematic view of an embodiment of a dry ingredient chilling system of the present invention.

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the invention and are not intended to be to scale.

The present embodiments use cryogenics, such as LIN and liquid $CO_2$, to successfully chill dry ingredients such as for example flour, sugar, grain, etc., within a pressure or vacuum conveyance system. To date, the use of a cryogen has not been successfully or commercially viable. The present embodiments use for example nitrogen in a conveyed flour or dry ingredient operation. Other embodiments use carbon dioxide as the cryogen, and include a modified injector system and gas purge for the injector.

Using a cryogen such as a nitrogen (N2) in known dry ingredient chilling systems was not possible, until now with the present embodiments, as the extremely cold temperature of nitrogen (−321° F.) would cause moisture to gather within the injector and the pipe. This moisture would combine with the flour; making known systems inoperable. The venturi injector apparatus of the present embodiments, constructed from TEFLON®, (TEFLON is a registered trademark of E.I. Dupont De Nemours and Company, Wilmington, Del. USA), functions as a thermal insulator, and does not cause condensation within the injection portion of the system. This reduces maintenance due to the unique injector design which will not transfer thermal energy to the flour and therefore, will not cause moisture/flour clogging of the injector. The wide sweep pipe elbow construction and installation also prevents clogging and clumping of the dry ingredients.

Another embodiment of the injector apparatus of the present invention includes an interchangeable orifice compression ring having a plurality of orifices therethrough a sidewall of same, the orifices or holes angled in a direction of flow of the dry ingredient, and also angled with respect to other of the orifices to impart a helical flow of the cryogen into the dry ingredient. A user can therefore select among a plurality of different rings, each of which has a different number and arrangement of orifices for a particular dry ingredient and amount of same to be chilled.

The flour chilling system embodiment consists of several components. The main component is a unique venturi apparatus constructed of food grade TEFLON, ultra-high-molecular-weight (UHMW) plastic/polyethylene or other food grade plastic that can withstand cryogenic temperatures.

The venturi injector apparatus has a low coefficient of friction, high insulating property and can withstand extremely cold temperatures without embrittlement. This construction prevents the chilled dry product from adhering to inner walls of the venturi injector apparatus.

The venturi injector apparatus is constructed so that kinetic energy of the cryogen sprayed tangentially and concentrically with respect to the dry powder flow is through a slit or a plurality of orifices of the venturi injector to create a vacuum and facilitate the flow of the flour/dry ingredients, despite the LIN, $LCO_2$ or another cryogen being introduced at that point. Usually, the introduction of nitrogen, $LCO_2$ or another cryogen at that point would only increase pressure, thereby interfering with the flow pattern and creating condensation from the extreme cold temperature. The present venturi injector creates a vacuum with the injected cryogen, etc., and provides thorough and uniform flow/mixing characteristics of the cryogen and dry ingredients to the dry ingredient stream. The plastic body construction of the injector apparatus prevents condensation, thereby avoiding disruption of the flow pattern of the dry ingredient.

One embodiment of the present venturi injector apparatus includes a concentric slit to uniformly distribute/spray the LIN, cryogen or $LCO_2$ into the flour and/or dry ingredients being moved pneumatically or by vacuum. This slit provides a uniform spray patter of for example the cryogen or $LCO_2$, uniformly distributing, equally comingling/mixing within the stream of conveyed flour and/or dry ingredient particles, and thermally transferring energy equally into the conveyed dry ingredient.

Another embodiment of the injector apparatus provides an interchangeable ring or cylinder with a plurality of orifices through which cryogen or LIN is injected into the dry ingredient stream.

Referring to FIGS. 1-4, a first embodiment of the dry ingredient chilling system and injector apparatus are shown.

The Venturi plastic injector apparatus is by way of example only approximately 20 inches long and 5 inches in diameter (20"×5"). The apparatus is not limited to these dimensions and can be constructed in other dimensions/sizes to accommodate the application, and pipe sizing, ingredient flowrates, etc. The length described above includes both the upper and lower plastic body tapered adapters to each be connected to the dry ingredient conveyer pipe. The body of the apparatus is constructed/machined from TEFLON or other plastic into a cylinder shape with four main components. It is designed so that when a lower component of the apparatus is turned/rotated to the left, the orifice area increases the slit circumference creating a larger orifice to supply more nitrogen into the dry ingredient flow. Conversely, when a lower component of the apparatus is turned to the right it reduces the orifice area thereby reducing cryogenic or $LCO_2$ flow into the dry ingredient. The lower component of the apparatus may be turned to the right to completely shut off the cryogenic or $LCO_2$. In effect, this feature allows the venturi injector apparatus to be sized for selecting the nitrogen/carbon dioxide injection flow rates for various applications. The lower component also includes a side port drilled therethrough for the injection of the cryogenic or $LCO_2$ into the apparatus.

The upper and lower components are machined such that when the two components are joined there is a cavity formed where the volume is filled with the cryogen or $LCO_2$ to be equally distributed and uniformly sprayed into the stream of flour or dry ingredient as per the circumference orifice size as selected. The upper component when fit into the lower component has a taper at the orifice that is machined uniformly around the circumference and is tapered to direct the flow in a direction of the flour or dry ingredient flow and thus, create a vacuum. The angle and directional cut of the orifice will determine the strength of the vacuum created. The upper component of the apparatus includes a unique feature, whereby the desired area size of the circumference orifice may be locked into place to repeatedly control the desired flow rate of the cryogen/carbon dioxide. This feature consists of a TEFLON or plastic lock ring and a gasket made from food grade plastic that can withstand low temperatures. The turning or locking mechanism is achieved by first machining a small groove around the circumference to receive the gasket. Once the gasket is snuggly fit into place it will provide a seal at a lower section of the apparatus to restrict the flow of the LIN or cryogen into the dry ingredient flow.

Figure 3:
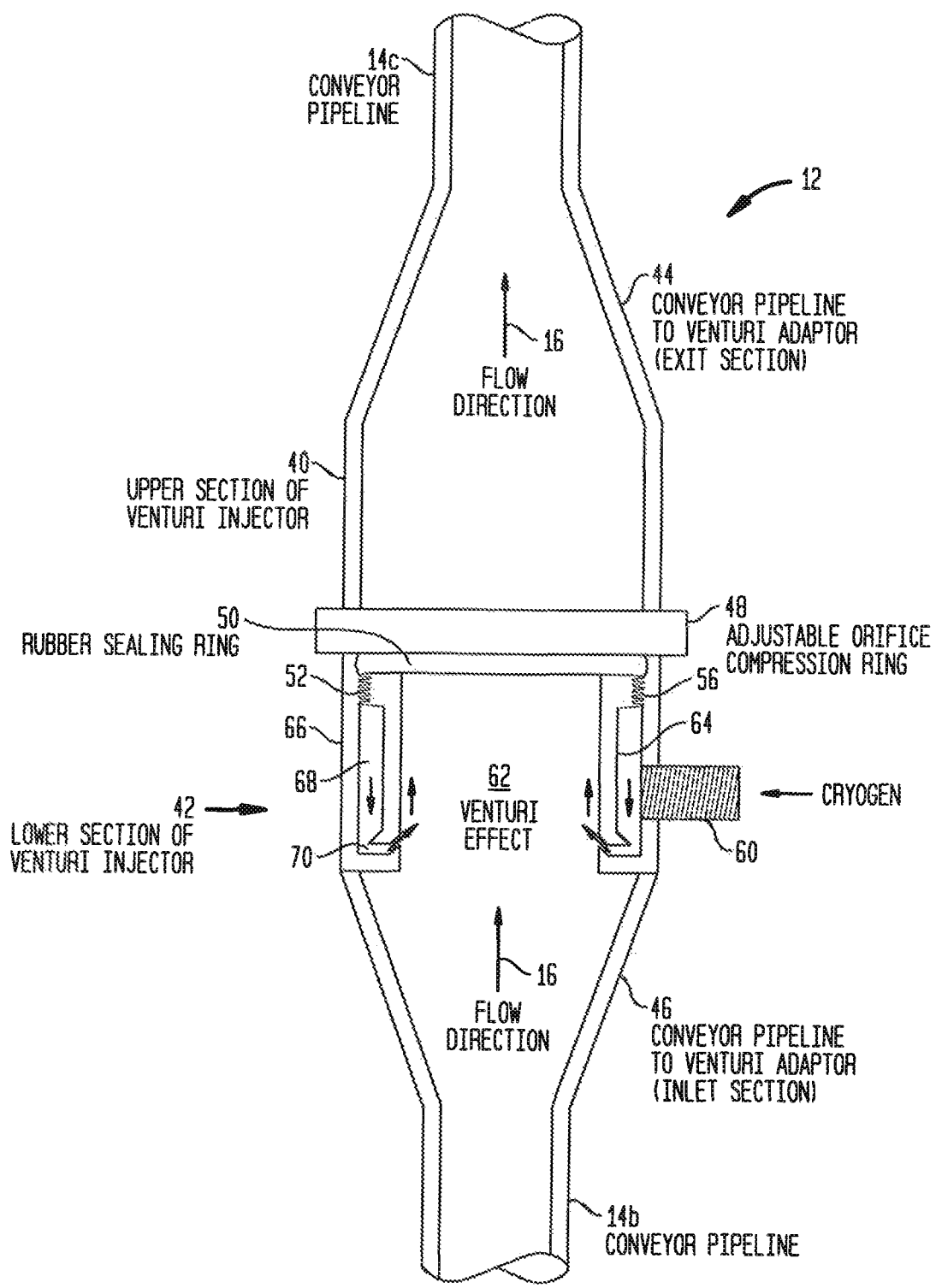
FIG. 3 shows another schematic view of the venturi apparatus embodiment of FIG. 2 in operation.
Figure 4:
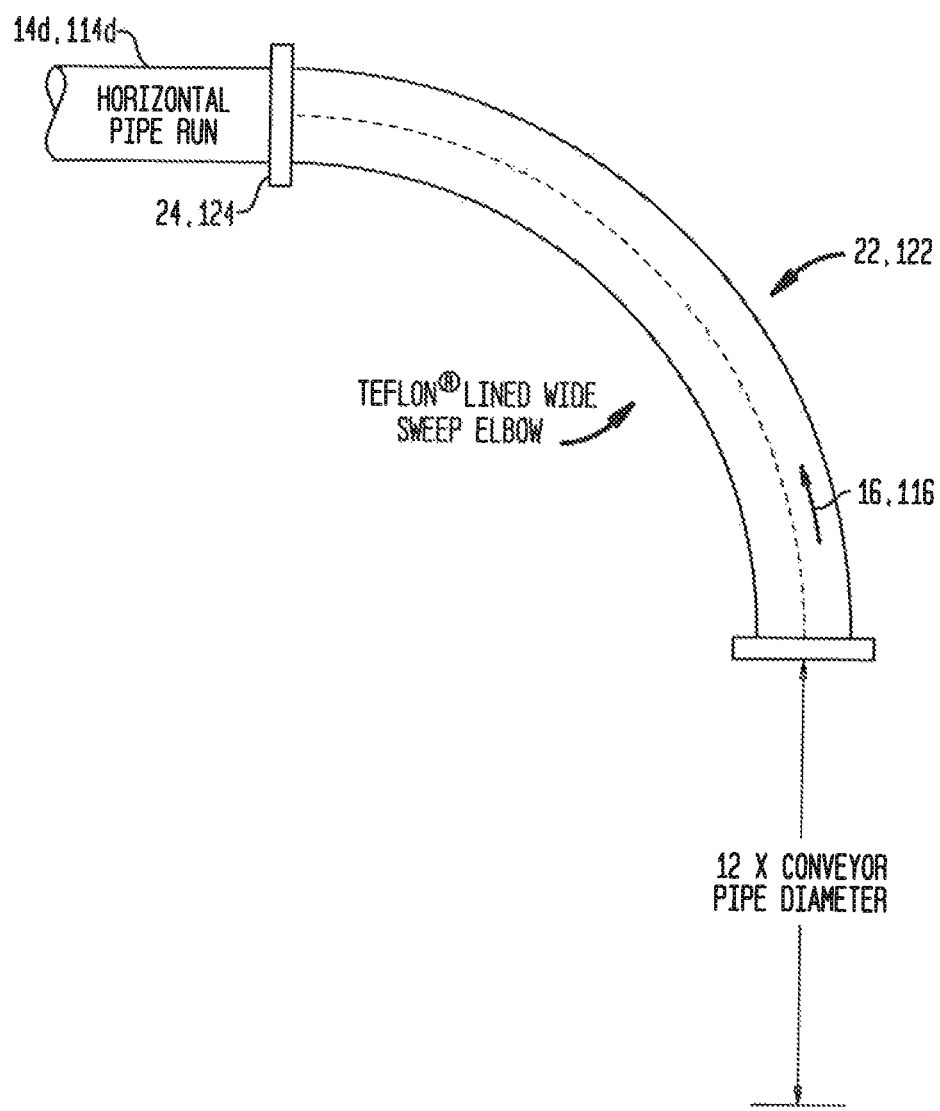
FIG. 4 shows a schematic view of an element of the chilling system of FIG. 1.

The cryogen is conveyed into the adjustable slit traversing the entire circumference of the plastic venturi injector apparatus, as shown in FIG. 3. The cryogen is then distributed around the circumference of the apparatus through the slit and fed uniformly into the flour or dry ingredient stream, which is cooled down by the cryogen. The cryogenic flow is controlled through a single modulating valve and a feedback loop with a thermocouple located 15 ft. to 20 ft. downstream of the injector apparatus.

The present system 10 can chill the flour or other dry powdered ingredients with either liquid nitrogen or liquid carbon dioxide.

The present system 10 uses a control panel comprising a process logic controller (PLC), thermocouple, single modulating valve, and a feedback loop as shown in FIG. 1. The control panel would also have an emergency stop, with high/low pressure and high f/low temperature shutoff.

The venturi injector apparatus is positioned and installed downstream of the sifter and on a vertical rise or leg of the flour conveyance system. See for example FIGS. 1 and 5.

The present system embodiments include a TEFLON or TEFLON lined wide-sweep pipe elbow (FIG. 4) positioned downstream of the venturi injector apparatus and into the horizontal stretch of the pipe run. This wide sweep elbow may or may not include a heating element to prevent sweating within the elbow.

At the option of the operator of the system and apparatus, the horizontal stretch of the pipeline should be insulated to the point of application (to the blender) to prevent moisture dewing or sweating along the pipeline. The present system uses an aluminum or stainless steel conveyance pipe (aluminum/stainless outer for stiffness/hanging rigidity) with a TEFLON/UHMW or plastic liner to substantially reduce if not eliminate sweating as a result of the chilled flour passing through this pipe.

A phase separator will be included to supply a good, food quality cryogen or $LCO_2$ to the injector apparatus.

Referring in particular to FIG. 1, a dry ingredient chilling system (the "system") is shown generally at 10 and includes a venturi injector apparatus 12 for thoroughly and uniformly providing liquid nitrogen (LIN), liquid carbon dioxide ($LCO_2$) or other cryogen substance into a dry ingredient moved through the system 10 to be cooled prior to subsequent processing such as by way of example only blending of the dry ingredient. For purposes of the description herein, the dry ingredient system 10 will also be referred to as the "system"; while the venturi injector apparatus 12 may also be referred to herein as the "injector apparatus" or the "apparatus."

The system 10 concludes a conveyor pipeline 14 consisting of a plurality of branches 14a-14d through which a dry ingredient such as by way of example only flour, sugar, etc., may be transferred from a silo or container vessel (not shown) through to an end use process such as for example a blender (not shown). For purposes of the description herein, reference to a dry ingredient and the examples thereof may be referred to herein as an "ingredient." Movement or flow of the ingredient through the branches 14a-14d of the conveyor pipeline 14 and the apparatus 12 are indicated by arrows 16.

The ingredient is moved from the silo through the first branch 14a into and out of a sifter 18 and thereafter into another branch 14b which extends downward in a vertical direction from the sifter. A lower portion of the branch 14b above an underlying surface of a facility in which the system 10 is mounted, is directed in a reverse direction to provide a U-shape or turned portion as shown generally at 20. The branch 14b therefore extends upward in a vertical direction into and in communication with an inlet of the apparatus 12 such that the flow 16 of the ingredient is in an upward or vertical direction into the apparatus. That is, the apparatus 12 is disposed downstream of the sifter 18 and the silo. Another branch 14c of the pipeline 14 is connected to an outlet of the apparatus 12, and extends further upward and into a wide-sweep elbow as shown generally at 22. The branch 14c is supported with a bracket 24 and thereafter extends in a horizontal direction as a branch 14d for introducing the ingredient into the blender, for example. The bracket 24 may also be at a position where the branch 14c is joined to the aforementioned horizontally directed branch 14d.

A phase separator (not shown) is connected to another pipeline 26 for introducing a very pure cryogen into the apparatus 12. A valve 28, such as for example a modulating control valve, is connected to the pipeline 26 for a purpose to be described hereinafter.

A thermocouple 30 is in communication within the branch 14d of the pipeline 14 to sense a temperature of a cool ingredient moving along the horizontal branch 14d as indicated by the arrow 16. Both the valve 28 and the thermocouple 30 are connected to a controller 32 which transceives signals between each one of the valve and the thermocouple to control an amount of the cryogen being introduced into the ingredient at the apparatus 12.

Figure 2:
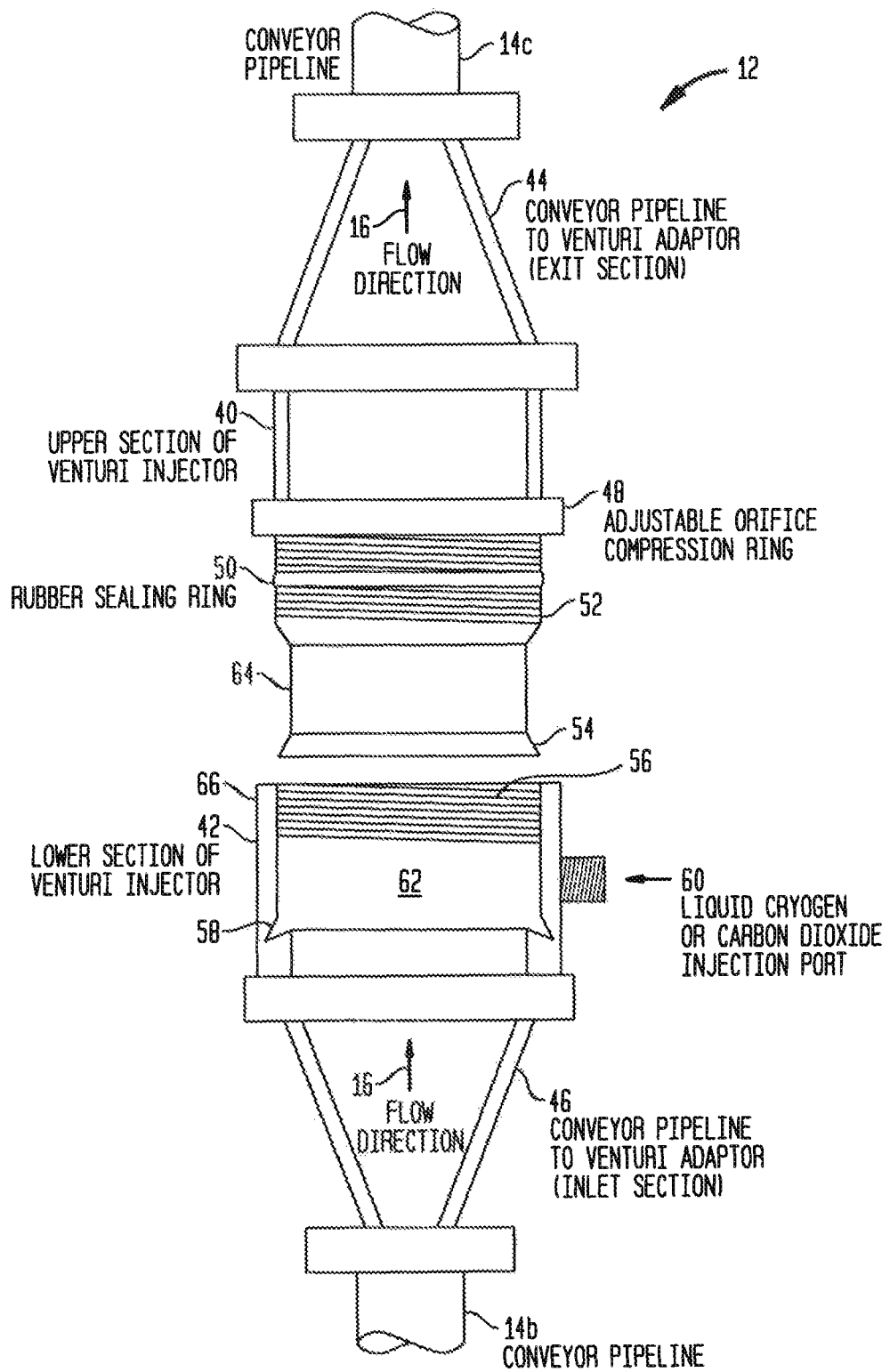
FIG. 2 shows a schematic view of a venturi apparatus embodiment of the system of FIG. 1.

Referring now to FIGS. 2-3, the apparatus 12 is shown with more particularity. The apparatus 12 includes an upper injector section 40 and a lower injector section 42. The upper and lower injector sections 40, 42, are constructed and arranged to be releasably attached to each other. The apparatus 12 also includes an exit adapter 44 mounted to the upper injector section 40 to connect same with the conveyor pipeline branch 14c, and an inlet adapter 46 mounted to the lower injector section 42 to connect same with the conveyor pipeline branch 14b.

The upper venturi section 40 includes an adjustable orifice compression ring 48, around which is disposed a rubber sealing ring 50 as shown in FIG. 2. The upper venturi section 40 is also threaded at 52 as shown in FIG. 2. A lower portion of the compression ring 48 is provided with a skirt 54 or flange extending outward for a purpose to be described hereinafter.

The lower section 42 is also provided with a complimentary threaded portion 56 for releasable engagement with the threads 52 of the upper venturi section 40. The lower section 42 includes at a lower or upstream region thereof a recess as shown generally at 58. The recess 58 has a shape corresponding to that of the skirt 54 to receive same for control of the cryogen being introduced into the apparatus 12, as will be described hereinafter. The lower venturi section 42 also includes a cryogen injection port 60 or cryogen inlet in fluid communication with a space 62 provided by the lower section 42.

Referring also to FIG. 3, the compression ring 48 has a section 64 with a reduced diameter arranged between the sealing ring 50 and the skirt 54. This section has a diameter which is less than a diameter of the space 62. When the upper venturi section 40 is threadably engaged to the lower venturi section 42 as shown in FIG. 3, the section 64 is spaced apart from and coacts within a sidewall 66 of the lower section 42 to provide a channel 68 therebetween which extends to an outlet slit 70 or orifice through which a cryogen is introduced to the ingredient flow 16 at the space 62. The channel 68 and the outlet slit 70 coact to provide a throughput region for the compression ring 48. By rotating the upper section 40 with respect to the lower section 42, a size of the slit 70 can be adjusted to control an amount and the speed of the cryogen being introduced into the ingredient flowing in the space 62 of the apparatus 12. As shown between FIGS. 2 and 3, the coaction of the skirt 54 and the recess 58 provides for the size of the outlet slit 70.

In operation and referring to the system 10 and the apparatus 12 of FIGS. 1-4, the power is turned on at the control panel 32 and an operator (not shown) of the system 10 actuates a compressor or blower to flow or convey the ingredient from the silo 18 (not shown) to the blender (not shown) downstream with respect to the system 10. The actuation will also move the ingredient out of the sifter 18. The pipeline 14 may be constructed having a diameter of for example 2-6 inches. The ingredient travels downward from an outlet of the sifter 18 in the pipeline branch 14b towards a floor or underlying surface (not shown) beneath the system 10, whereupon the pipeline branch and the ingredient therein are turned and directed upward to the apparatus 12. As shown in FIG. 1, the apparatus 12 is disposed or interposed vertically between the branches 14b, 14c, and upstream of the wide sweep elbow 22. If condensate or sweating will be present of the pipeline 14, due to the atmosphere ambient temperature of the space of the facility for the system 10, the pipeline should be aluminum or stainless steel with a TEFLON or plastic lining to insulate the pipeline.

When the operator actuates the blower to convey the ingredient, the system 10 is also actuated. That is, the PLC at the control panel 32 receives signals from the thermocouple 30, which is inserted into the pipeline branch 14d at approximately 20-40 feet downstream from the wide sweep elbow 22. The operator has preset a set point temperature of for example 40-60° F. The controller 32 will automatically open the valve 28 to permit the injection of high quality fresh cryogen from the phase separator through the pipe 26 through the injection port 60 into the channel 68 of the apparatus 12. The valve 28 will be modulated as per the signal from the controller 32 pertaining to maintain the set point temperature to within one degree, thereby delivering the chilled or cooled ingredient (such as for example flour) at the desired temperature to the blender (not shown) downstream of the thermocouple 30. Once a predetermined weight of flour is confirmed in the blender, the operator shuts off or secures the blower or, in certain embodiments, the controller 32 automatically secures the blower responsive to the weight of chilled ingredient sensed in the blender. The system 10 can also be automatically shut down from this input signal from the blender.

The system 12 may also include indicators of high temperature, i.e. not reaching a desired set point; and high pressure as the pressure in the pipeline 14 is usually under 11 psig and therefore, the pipeline would be equipped with at least one 15 psig pressure relief valve.

Additionally, the introduction of the cryogen into the apparatus 12 and resulting chilled ingredient will increase the additional gas volume in the pipeline 14 of from 0.5-1 psig pressure and therefore, a relief valve may be opened to insure the system 10 is not pressurized in excess of its operational capacity.

Figure 5:
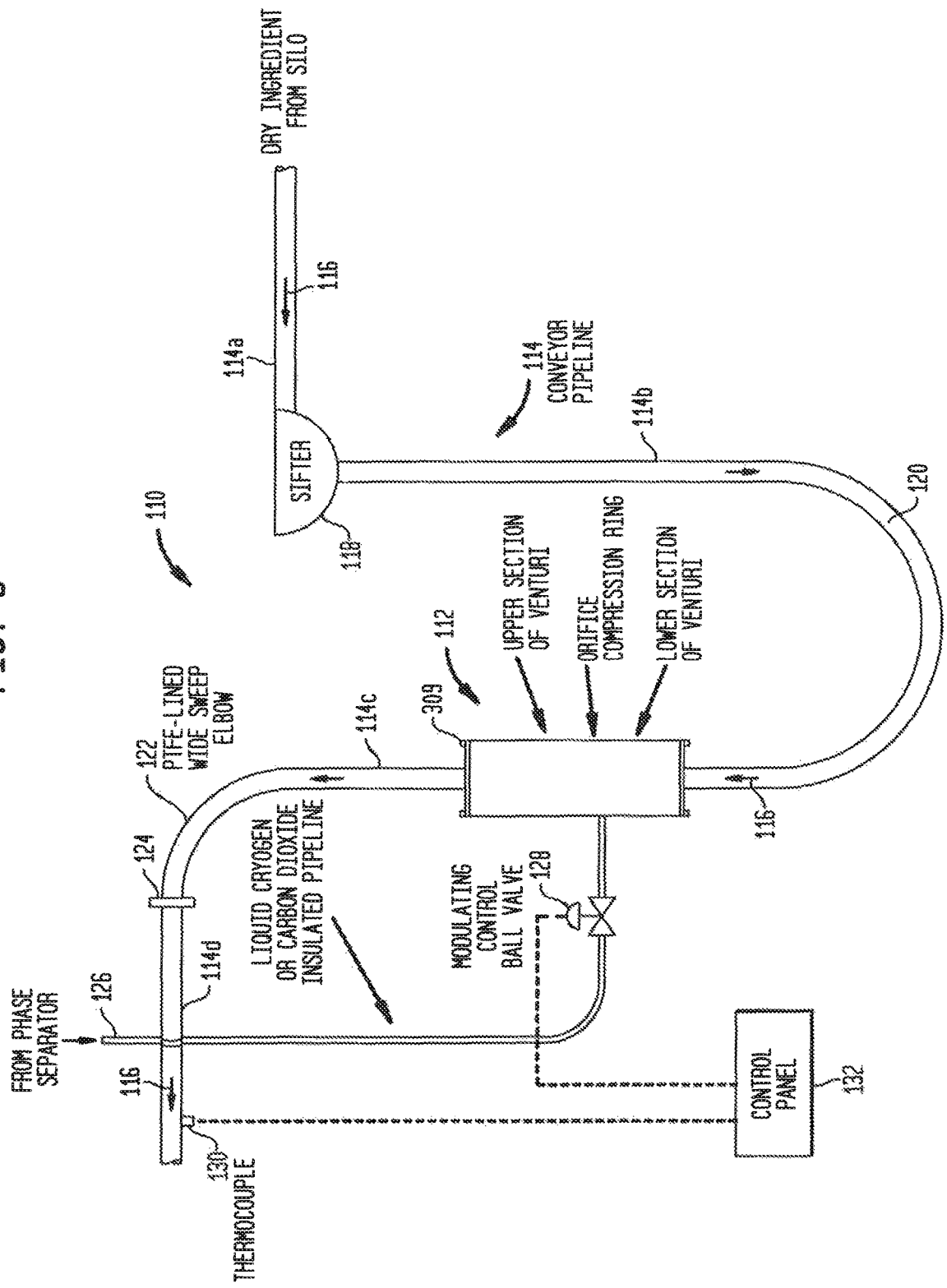
FIG. 5 shows a schematic view of another embodiment of a dry ingredient chilling system of the present invention.
Figure 6:
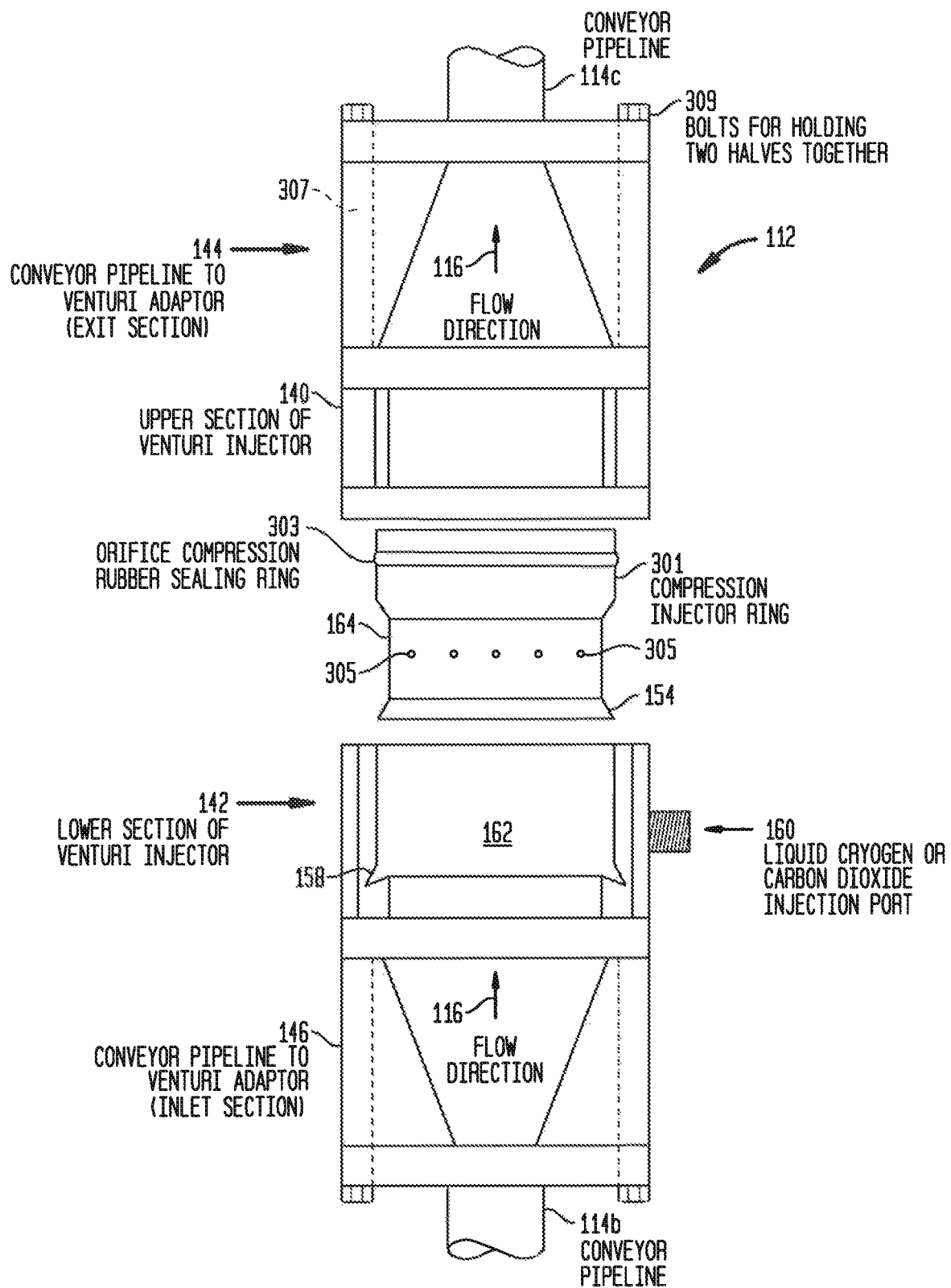
FIG. 6 shows a schematic view of another venturi apparatus embodiment of the system of FIG. 5.

Another exemplary embodiment of each of a system and an apparatus constructed and operated in accordance with the present invention are illustrated in FIGS. 5-7, respectively. Elements illustrated in FIGS. 5-7 which correspond to the elements described above with respect to FIGS. 1-4 have been designated by corresponding reference numerals increased by one hundred, respectively. The embodiment of FIGS. 5-7 is designed for use in the same manner as the embodiment of FIGS. 1-4 unless otherwise stated.

Referring to FIGS. 5-7, other embodiments of the chilling system and injector apparatus are shown. The injector apparatus 112 of this embodiment includes a compression injector ring 301 (injector ring) which can be by way of example only, 6 inches in diameter and 3 inches in length. Other dimensions can be used. The compression injector ring 301 has a somewhat cylindrical shape and is constructed to be seated such that the skirt 154 or flange is releasably received in the recess 158. The injector ring 301 is not threadably engaged into position but rather, the upper section 140 and lower section 142 sandwich the injection ring 301 therebetween for operation as shown in FIGS. 6 and 7.

The injector ring 301 includes a rubber sealing ring 303 to provide a seal for the space 162 at the lower section 142, when the ring is seated in position. The injector ring 301 also includes at least one and for most applications a plurality of orifices 305 or holes extending therethrough in any number of patterns along a sidewall of the ring. The plurality of orifices 305 provide a throughput region for the injector ring 301. As shown in FIG. 6, the orifices 305 are arranged in a uniform linear pattern, although other patterns may be employed. Each one of the orifices 305 is angled at 30-45 degrees to a direction of the ingredient flow (direction of the arrows 116), as shown in FIG. 7. Additionally, each one of the orifices 305 is angled with respect to each other, and for most applications in a similar direction, from 10-20 degrees such that the cryogen is provided with a helical displacement upon introduction into the ingredient at the space 162. The result is that the incoming cryogen spray from the channel 168 is introduced for mixing with the ingredient in a helical pattern for a more thorough uniform mixing of the cryogen with the ingredient which provides a more thorough and uniform cooling or chilling of the ingredient.

The user of the system 110 and the apparatus 112 for this embodiment can select from a plurality of different types of compression injector rings 301, having different patterns for the orifices 305, depending upon the type of ingredient being cooled and the volume of the ingredient for processing during the application. The compression injector ring 301 is replaceable or interchangeable in the apparatus 112.

A plurality of rods 307 are used to align and join the sections 140, 142, 144, 146 in registration with each other as shown in FIGS. 6-7. The sections are being secured to sandwich the injector ring 301 in the space 162 during operation of the apparatus 112. Bolts 309 secure the sections together with the rods 307. Such construction provides for the interchangeability of the compression injector rings 301 as discussed above.

Using a cryogen such as a nitrogen may be less expensive then carbon dioxide, and carbon dioxide may not be available within a certain geography. Carbon dioxide is a secondary manufactured product and production/delivery of same may be interrupted or cease with regular frequencies or for a prolonged period of time. The present system 10,110 and apparatus 12,112 allows for a consistent chilled dry ingredient and therefore, a consistent dough temperature and better dough quality using for example liquid nitrogen. The invention provides a much more consistent dough, reduced maintenance due to unique TEFLON injector apparatus design not transferring thermal energy (which would cause moisture/flour to clog the injector), and the wide sweep elbow, design and installation.

It will be understood that the embodiments described herein are merely exemplary, and that a person skilled in the art may make variations and modifications without departing from the spirit and scope of the invention. All such variations and modifications are intended to be included within the scope of the invention as described herein and provided in any appended claims. It should be understood that the embodiments described above are not only in the alternative, but can be combined.

What is claimed is:

1. An apparatus for chilling a dry ingredient, comprising:
a housing including an interior space through which the dry ingredient flows, a first threaded portion at the interior space, and a recess extending around a diameter of the interior space;
a compression ring positioned in the interior space and through which the dry ingredient flows, the compression ring including a second threaded portion at an exterior of the compression ring for releasable engagement with the first threaded portion, and a reduced diameter terminating in a skirt, the skirt selectively movable into and out of the recess for being positionable within the interior space and having a region constructed to coact with the housing for providing an adjustable passageway through which a cryogen is introduced into the dry ingredient; and
an injection port in fluid communication with the adjustable passageway for introducing the cryogen into the adjustable passageway.

2. The apparatus of claim 1, wherein the compression ring is removably mountable to the interior space.

3. The apparatus of claim 1, wherein the compression ring is movable in a direction parallel to the dry ingredient flows through the interior space.

4. The apparatus of claim 1, wherein the housing further comprises an inlet arranged upstream and beneath the compression ring, and an outlet arranged downstream and above the compression ring.

5. The apparatus of claim 4, further comprising a pipe elbow connected to the outlet, the pipe elbow having an interior surface coated with plastic material.

6. The apparatus of claim 1, wherein at least the housing and the compression ring are constructed from food grade plastic material.

7. The apparatus of claim 1, further comprising a valve coacting with the injection port for controlling an amount of the cryogen introduced into the adjustable passageway.

* * * * *